(12) United States Patent
Evans et al.

(10) Patent No.: US 11,957,137 B2
(45) Date of Patent: Apr. 16, 2024

(54) APPARATUS FOR PREPARATION OF FROZEN CONFECTION PRODUCTS

(71) Applicant: Conopco, Inc., Englewood Cliffs, NJ (US)

(72) Inventors: Victoria Suzanne Elizabeth Evans, Bedford (GB); William Douglas Jeatt, Hitchin (GB); Deborah Jane Noble, Wellingborough (GB)

(73) Assignee: Conopco, Inc., Englewood Cliffs, NJ (US)

( * ) Notice: Subject to any disclaimer, the term of this patent is extended or adjusted under 35 U.S.C. 154(b) by 178 days.

(21) Appl. No.: 17/434,830

(22) PCT Filed: Mar. 4, 2020

(86) PCT No.: PCT/EP2020/055660
§ 371 (c)(1),
(2) Date: Aug. 30, 2021

(87) PCT Pub. No.: WO2020/178317
PCT Pub. Date: Sep. 10, 2020

(65) Prior Publication Data
US 2022/0142199 A1 May 12, 2022

(30) Foreign Application Priority Data
Mar. 4, 2019 (EP) .................................... 19160564

(51) Int. Cl.
*A23G 9/28* (2006.01)
*A23G 9/48* (2006.01)

(52) U.S. Cl.
CPC .............. *A23G 9/28* (2013.01); *A23G 9/282* (2013.01); *A23G 9/283* (2013.01); *A23G 9/288* (2013.01); *A23G 9/48* (2013.01)

(58) Field of Classification Search
CPC ............ A23G 9/48; A23G 9/24–9/245; A23G 9/28–9/283; A23G 9/288
See application file for complete search history.

(56) References Cited

U.S. PATENT DOCUMENTS 2,887,072 A * 5/1959 Watkins ................. A23G 9/281
251/155
3,014,437 A * 12/1961 Dutchess ............... A23G 9/286
366/76.6

(Continued)

FOREIGN PATENT DOCUMENTS

EP 2345332 7/2011
EP 3148346 4/2017

(Continued)

OTHER PUBLICATIONS

Search Report and Written Opinion in EP19160564.1; dated Sep. 11, 2019.

(Continued)

*Primary Examiner* — Drew E Becker
(74) *Attorney, Agent, or Firm* — Gerard J. McGowan, Jr.

(57) ABSTRACT

An apparatus for the preparation of frozen confectionery products comprising a filling head (1) comprising one or more frozen confection inlets (3) connectable to a source of one or more frozen confections comprising one or more inclusions, a mixing chamber (4) and an outlet (2), a first housing (5) comprising a nozzle (6) is connectable to, and rotatable in relation to, the filling head outlet (2), and the outlet of the nozzle (7) has a cross section comprising a central section (8) and peripheral sections (9), wherein an annular shape (24) can be superimposed on the central section (8) and the diameter of the annular shape (24) has a ratio of from 3:1 to 6:1 of the longest length of the one or more inclusions, and the longest length of the one or more inclusions is from 2 mm to 10 mm. A process for the (Continued)

preparation of a frozen confection product comprising the foregoing apparatus and a product prepared according to the process.

9 Claims, 5 Drawing Sheets

(56) References Cited

U.S. PATENT DOCUMENTS

| | | | | |
|---|---|---|---|---|
| 4,668,561 A * | 5/1987 | Ney | | A23G 9/285 |
| | | | | 222/386 |
| 4,873,104 A * | 10/1989 | Butcher | | B29C 48/175 |
| | | | | 426/100 |
| 4,881,663 A * | 11/1989 | Seymour | | A23G 9/282 |
| | | | | 222/144.5 |
| 5,283,070 A * | 2/1994 | Bertrand | | A23G 9/282 |
| | | | | 426/101 |
| 5,670,185 A * | 9/1997 | Heck | | B29C 48/05 |
| | | | | 425/382.3 |
| 6,223,949 B1 * | 5/2001 | Spencer | | A23G 3/2015 |
| | | | | 137/637.4 |
| 6,391,494 B2 * | 5/2002 | Reitz | | H01M 4/131 |
| | | | | 429/219 |
| 7,017,783 B1 * | 3/2006 | Hunter | | A23G 9/00 |
| | | | | 222/327 |
| 7,165,878 B1 * | 1/2007 | Mimran | | A23G 9/24 |
| | | | | 366/177.1 |
| 11,439,158 B2 * | 9/2022 | Farina | | B01F 35/7179 |
| 2003/0068409 A1 * | 4/2003 | Binley | | A23G 9/285 |
| | | | | 426/101 |
| 2003/0183090 A1 * | 10/2003 | Binley | | A23G 9/28 |
| | | | | 99/455 |
| 2006/0102016 A1 * | 5/2006 | Ulrich | | A23G 9/48 |
| | | | | 99/452 |
| 2006/0251783 A1 * | 11/2006 | D'Esposito | | A23G 9/288 |
| | | | | 426/438 |
| 2009/0016150 A1 * | 1/2009 | Mimran | | A23G 9/24 |
| | | | | 366/134 |
| 2010/0133360 A1 * | 6/2010 | Gaetano | | A23G 1/045 |
| | | | | 222/137 |
| 2011/0177209 A1 * | 7/2011 | Farina | | A23G 9/283 |
| | | | | 426/89 |
| 2011/0200718 A1 * | 8/2011 | Swertvaegher | | B65B 3/326 |
| | | | | 141/1 |
| 2013/0045310 A1 * | 2/2013 | Ricco | | A23G 9/28 |
| | | | | 99/452 |
| 2017/0188601 A1 * | 7/2017 | Farina | | A23G 9/48 |
| 2018/0168185 A1 * | 6/2018 | Moreau | | A23G 9/282 |
| 2020/0178560 A1 * | 6/2020 | Gerber | | A23G 9/12 |
| 2021/0068418 A1 * | 3/2021 | Gupta | | A23G 9/288 |
| 2021/0068419 A1 * | 3/2021 | Spirk | | A23G 9/225 |

FOREIGN PATENT DOCUMENTS

| | | |
|---|---|---|
| EP | 3313196 | 5/2018 |
| EP | 2869712 | 8/2018 |

OTHER PUBLICATIONS

Search Report and Written Opinion in PCTEP2020055660; May 12, 2020.
Written Opinion in PCTEP2020055660; dated Feb. 22, 2021.
IPRP2 in PCTEP2020055660; dated Jun. 2, 2021.

* cited by examiner

Figure 5

# APPARATUS FOR PREPARATION OF FROZEN CONFECTION PRODUCTS

FIELD OF THE INVENTION

An apparatus for the preparation of frozen confection products comprising a filling head (1) comprising one or more frozen confection inlets (3) connectable to a source of one or more frozen confections comprising one or more inclusions, a mixing chamber (4) and an outlet (2), a first housing (5) comprising a nozzle (6) is connectable to, and rotatable in relation to, the filling head outlet (2), and the outlet of the nozzle (7) has a cross section comprising a central section (8) and peripheral sections (9), wherein width of the central section (8) is from 6 mm to 60 mm. A process for the preparation of a frozen confection product comprising the foregoing apparatus and a product prepared according to the process.

BACKGROUND OF THE INVENTION

Extrusion of frozen confection comprising inclusions has been demonstrated through the use of an annular shaped nozzle exit in order to preserve the quality of the inclusions and prevent blockage of the nozzle. An exemplary nozzle is disclosed in EP 3 313 196 A1. EP 3 313 196 A1 discloses an apparatus suitable for co-extruding a frozen confection material encapsulating a second confection material, wherein the first frozen confection material may comprise inclusions of 1 to 5 mm in length and is extruded through a nozzle wherein the outlet has an annular cross section. The obtained frozen confection product comprises a first frozen confection material encapsulating a core of second confection material.

It is possible to obtain a random distribution of a second confection material within a first frozen confection material. EP 3 148 346 B1 discloses an apparatus for the preparation of frozen confection products, the apparatus comprises inlets for the materials and a rotatable mixing chamber. The frozen confection products are prepared by closing the outlet control means and filling a mixing chamber with both first and second confection material and rotating the mixing chamber, the two materials are mixed though the action of the turbulent vortices created by the rotation of the mixing chamber. The mixed material is extruded through an annular outlet and forms a frozen confection cone product comprising a randomly distributed first and second material throughout the cone void. EP 3 148 346 B1 is silent with regard either first or second materials comprising inclusions.

In order to provide a fluted shape of frozen confection that extends above the receptacle of the frozen confection product, typically a traditional star-shaped fluted nozzle, wherein the star-shape is formed from a zig-zag pattern in the nozzle's longitudinal direction. The use of inclusions with such a nozzle results in the inclusions sticking to and ultimately blocking the nozzle exit.

EP 2 869 712 B1 discloses an apparatus and method for making a coated frozen confection product by co-extrusion, wherein the co-extruded product is extruded through a star-shaped nozzle exit with spreading tongue. EP 2 869 712 B1 is silent with regard to the presence of inclusions within either the frozen confection or coating. The frozen confection product formed comprises a frozen confection dispensed into a receptacle and a coated frozen confection dispensed extending above the receptacle. The coating is provided on the surface of the extruded frozen confection whist the nozzle is moved in a circular, orbital motion while simultaneously being uplifted. The nozzle follows a spiral path but does not rotate itself, forming a helical pattern of coating within a cup or cone and presence of coating on surface of the frozen confection. EP 2 869 712 B1 is silent with regard to the use of this nozzle with frozen confection comprising inclusions.

The prior art teaches co-extrusion of materials to form frozen confection products wherein the second material is an encapsulated core, it is randomly distributed within the first material or forms a coating on the surface and helical structure within the first material that extends above the receptacle. The provision of a first or second material further comprising inclusions is obtained through extrusion of the second material as an encapsulated core product; however, no other disclosure teaches the provision of inclusions within either the first or second frozen confection or coating materials.

In order to provide novel frozen confection products, there is a need for an apparatus that enables extrusion of one or more frozen confections comprising inclusions of longest length of from 2 mm to 10 mm, wherein the frozen confection is positioned within the receptacle and extends above the receptacle, and the frozen confection that extends above the receptacle is fluted and one or more sauces are randomly distributed within the frozen confection products and provided on the fluted surface of the frozen confection. The apparatus provides the desired frozen confection product architecture without damaging the inclusions and without the inclusions sticking to the inside of the nozzle exit and ultimately blocking the nozzle exit. The apparatus is suitable for industrial application.

SUMMARY OF THE INVENTION

An apparatus for the preparation of a frozen confectionery product comprising a filling head (1) comprising one or more frozen confection inlets (3) connectable to a source of one or more frozen confections comprising one or more inclusions, a mixing chamber (4) and an outlet (2), a first housing (5) comprising a nozzle (6) is connectable to, and rotatable in relation to, the filling head outlet (2), and the outlet of the nozzle (7) has a cross section comprising a central section (8) and peripheral sections (9), wherein the width of the central section (8) is from 6 mm to 60 mm. A process for the preparation of a frozen confection product comprising the foregoing apparatus and a product prepared according to the process.

DETAILED DESCRIPTION OF THE INVENTION

An aspect of the present invention is directed towards an apparatus for the preparation of frozen confectionery products comprising a filling head (1) comprising one or more frozen confection inlets (3) connectable to a source of one or more frozen confections comprising one or more inclusions, a mixing chamber (4) and an outlet (2), a first housing (5) comprising a nozzle (6) is connectable to, and rotatable in relation to, the filling head outlet (2), and the outlet of the nozzle (7) has a cross section comprising a central section (8) and peripheral sections (9), wherein the width of the central section (8) is from 6 mm to 60 mm.

An aspect of the present invention is directed towards an apparatus for the preparation of frozen confectionery products comprising a filling head (1) comprising one or more frozen confection inlets (3) connectable to a source of one or more frozen confections comprising one or more inclusions, a mixing chamber (4) and an outlet (2), a first housing (5) comprising a nozzle (6) is connectable to, and rotatable in relation to, the filling head outlet (2), and the outlet of the nozzle (7) has a cross section comprising a central section (8) and peripheral sections (9), wherein an annular shape (24) can be superimposed on the central section (8) and the diameter of the annular shape (24) has a ratio of from 3:1 to 6:1 of the longest length of the one or more inclusions, and the longest length of the one or more inclusions is from 2 mm to 10 mm.

The term 'width of the central section (8)' is intended to be synonymous with 'the diameter of an annular shape (24) that can be superimposed on the central section (8)'. The term width of the central section (8) means the maximum width of the central section (8).

Cross section is intended to mean the image of a horizontal plane orthogonal to the rotational axis of the nozzle (6) at a specific position of the nozzle (6) that defines the internal recess shape in that plane.

The annular shape (24) that is superimposed on the central section (8) of the cross section of the fourth part (14) is the largest diameter annular shape (24) possible to superimpose on the central section (8), i.e.: where the central section (8) is annular, the superimposed annular shape (24) is the same diameter as the central section (8). Where the central section (8) is, for example, polygonal, the superimposed annular shape (24) touches each side of the polygon.

Superimposed means the outline of a shape, i.e.: an annular shape (24) (e.g.: a circle), that is placed or laid over the cross section of the central section of the outlet of the nozzle. A superimposed annular shape (24) does not form part of the physical structure of the apparatus. The term superimposed annular shape (24) is intended as a means for measuring the width of the central section (8) of the nozzle outlet (7).

In an embodiment of the invention the diameter of the annular shape (24) superimposed onto the central section (8) has a ratio of from 3:1 to 6:1, from 3:1 to 5:1, from 3:1 to 4:1 of the longest length of the one or more inclusions, and the longest length of the one or more inclusions is from 2 mm to 10 mm.

In an embodiment of the invention the width of the central section (8) has a ratio of from 3:1 to 6:1, from 3:1 to 5:1, from 3:1 to 4:1 of the longest length of the one or more inclusions, and the longest length of the one or more inclusions is from 2 mm to 10 mm.

In an embodiment of the invention, the width of the peripheral sections (9) is from 5% to 50% in length of the diameter (i.e.: the width) of the cross section of the central section (8).

In an embodiment of the invention, the cross section of the central section (8) and peripheral sections (9) is star-shaped comprising from 3 to 8 points. Wherein star-shaped means a cross section with a central section (8) that is typically annular or polygonal, and peripheral sections (9) that may be called points or arms and are typically triangular or rectangular in shape.

In an embodiment of the invention, the centre of the central section (8) is the rotational axis of the nozzle (6).

In an embodiment of the invention, the filling head (1) comprises one or more first sauce inlets (10) connectable to one or more sources of one or more first sauces.

In an embodiment of the invention, the nozzle (6) comprises four parts, the first part (11) comprising an annular cross section and parallel walls, i.e.: the first part is cylindrical, adjoining a second part (12) also comprising an annular cross section and parallel walls, i.e.: the second part is cylindrical, adjoining a third part (13) that is frusto-conical and tapers towards the fourth part (14) that is cylindrical, wherein both the third (13) and four parts (14) comprise longitudinal protrusions (15) positioned on the inner surface of the nozzle walls (23).

In an embodiment of the invention, the third part (13) has an annular cross section and longitudinal protrusions (15) protruding from the inner surface of the nozzle walls (23), wherein the longitudinal protrusions (15) taper inwards and increase in height towards the fourth part (14) of the nozzle (6) that comprises parallel walls and longitudinal protrusions (15). I.e.: the forth part (14) is cylindrical in shape and comprises longitudinal protrusions (15) on the inner surface of the nozzle walls (23). Preferably the third part (13) is a frusto-conical shape comprising longitudinal protrusions (15).

The longitudinal protrusions (15) in the fourth part (14) typically do not vary in height in the longitudinal direction. The length of the peripheral sections (9) of the cross section of the nozzle outlet (7) [comprising both the central (8) and peripheral sections (9)] corresponds to the maximum height of the longitudinal protrusions (15).

Longitudinal protrusion (15) means a protrusion positioned on the inner wall (23) of the nozzle (6), wherein the longest length of the protrusion (15) is aligned with the direction of the tapering of the frusto-conical shape of the third part (13) of the nozzle (6).

The longitudinal protrusions (15) of the third part (13) increase in height with increasing distance from the second part (12) of the nozzle (6). Preferably, the internal surface of the walls (23) of the third part (13) comprise from 3 to 8; from 4 to 7; from 5 to 6; longitudinal protrusions (15).

The longitudinal protrusions (15) of the third part (13) increase in height with increasing proximity to the fourth part (14). The longitudinal protrusions (15) are positioned about a central section (8) and are adjacent to corresponding peripheral sections (9) present between the longitudinal protrusions (15). The cross section of the fourth part (14) comprises a central section (8) adjoined to peripheral sections (9). The central point of the central section (8) is the rotational axis of the nozzle (6). Preferably, the central section cross section (8) has an annular or polygonal shape.

The diameter of the annular shape (24) superimposed on the central section (8) is from 6 mm to 60 mm, from 6 mm to 45 mm, from 6 mm to 30 mm, from 9 mm to 27 mm, from 12 mm to 24 mm. The width of the central section (8) is from 6 mm to 60 mm, from 6 mm to 45 mm, from 6 mm to 30 mm, from 9 mm to 27 mm, from 12 mm to 24 mm.

The peripheral sections (9) correspond to the voids between the longitudinal protrusions (15) and are positioned at equidistant points on the circumference of the annular shape (24) superimposed on the central section (8) or at each corner of the polygonal shaped central section (8). Typically, the polygonal shape of the central section (8) corresponds to the number of longitudinal protrusions (15) present on the surface of the nozzle wall or walls (23).

The term recess is used interchangeably with void and is intended to mean the space that the nozzle walls (23) enclose and that the one or more frozen confections, one or more sauces or one or more frozen confections and one or more sauces are extruded through.

The peripheral sections (9) may either have a constant width from the central most point of the cross section of the nozzle outlet (7) to the periphery of the cross section. Alternatively, the peripheral sections (9) may decrease in width towards the periphery of the cross-section. The widths of the peripheral sections (9) are from 5% to 50%; from 6% to 47%; from 8% to 42% in length of the diameter of the cross section of the central section (8). The width of the peripheral sections (9) of the cross section of the nozzle outlet (7) may also be defined by the longest length of the one or more inclusions of the frozen confection extruded through the apparatus. The ratio of the constant width of the peripheral sections (9) of the cross section of the nozzle outlet (7) to the longest length of the one or more inclusions present in the frozen confection is from 0.5:1 to 5:1; of from 0.6:1 to 4.5:1; of from 0.7:1 to 4:1.

The fourth part (14) may also comprise one or more second sauce outlets (16). The one or more second sauce outlets (16) are positioned on the longitudinal protrusions (15) of the fourth part (14) of the nozzle (6). The opening of the sauce outlet(s) (16) can be of any shape such as rectangular, square, circular or oval. In a preferred embodiment the opening is oval.

The nozzle (6) is connected to the first housing (5) and rotates together with rotation of the first housing (5). The first housing (5) is connectable to the outlet of the filling head (2) and comprises a means (17) for the housing (5) to engage with a means for rotating the housing, and a void (18) adjacent to the second sauce inlet (19) of the nozzle wall (23). The void of the housing is connectable to a second sauce inlet (20) and a source of second sauce. The void (18) of the housing forms an annular sauce chamber (18) comprising an upper and outer wall from the first housing (5), and a lower and inner wall from the end of the wall of the second part (12) of the nozzle (6) and the wall (23) of the first part (11). EP 3 148 346 B1 discloses an exemplary static annular sauce chamber connectable to sauce inlet passages and a rotating mixing chamber.

In an embodiment of the present invention, the first housing (5) comprises a means (17) for engaging with a means for rotation, such as teeth for engaging with a gear and belt mechanism. The means (17) for engaging with a means for rotation is positioned on the first housing (5), preferably adjacent to the connection between the first housing (5) and the filling head outlet (2).

The first housing (5) comprising the nozzle (6) rotates at a speed of from 100 to 140 rpm, from 110 to 130 rpm. The housing comprising the nozzle (6) rotates from 1.0 to 4.0; from 1.5 to 3.5 times per frozen confection product formation, from 2.0 to 3.0 times per frozen confection product formation.

A second, stationary housing (21) surrounds the first housing (5). The second housing (21) comprises a stationary second sauce inlet (20), connectable to the first housing void (18) and annular sauce chamber formed from the position of the first housing void (18) in relation to the nozzle (6).

In an embodiment of the invention, the wall or walls (23) of the nozzle (6) comprise one or more second sauce inlets (19), one or more second sauce channels (22) and one or more second sauce outlets (16) positioned on the inner surface of the wall or walls (23) of the nozzle (6). The second sauce inlets (19), second sauce channels (22) and second sauce outlets (16) form a means for delivering a second sauce from the annular sauce chamber (18) to the nozzle outlet (7). The number of second sauce channels (22) correspond to the number of longitudinal protrusions (15) of the nozzle (6). Alternatively, the number of sauce channels (22) may be less than the number of longitudinal protrusions (15) of the nozzle (6).

The nozzle wall or walls (23) of the second (12), third (13) and fourth (14) parts may comprise one or more second sauce inlets (19) connectable to one or more second sauce channels (22) and second sauce outlets (16) and the second sauce inlet (19) is positioned where the wall of the first (11) and second (12) parts connect; i.e.: where the thickness of the wall increases at the intersection of the walls of the first (11) and second (12) parts. The second sauce outlet (16) is located on the third (13) or fourth (14) parts of the nozzle (6), preferably, the fourth part (14).

In an embodiment of the invention, the filling head (1) comprises at least one frozen confection inlet (3) connectable to a source of a frozen confection, a mixing chamber (4) and an outlet (2), an exemplary filling head is disclosed in GB 1 165 448 in an embodiment of the invention, the filling head provides both a source of frozen confection and a source of first sauce.

In an embodiment of the invention, the filling head (1) comprises at least one frozen confection inlet (3) connectable to a source of a frozen confection, at least one first sauce inlet (10) connectable to a source of one or more first sauces, a mixing chamber (4) and an outlet (2). EP 2 345 332 B1 discloses an exemplary filling head comprising at least one frozen confection inlet connectable to a source of a frozen confection, at least one first sauce inlet connectable to a source of first sauce, a mixing chamber and a filling head outlet.

In a further embodiment, the invention relates to a filling head (1) for variegating or marbleizing one or more frozen confections or one or more first sauces into one or more frozen confections. Such variegation results in ripples of differently coloured materials, such as first sauces, into frozen confections. One or more frozen confections and one or more first sauces are dosed into the filling head through their respective outlets as disclosed in EP 2 345 332 B1 to obtain a combined stream of one or more frozen confections and one of more first sauces.

Preferably the sauce is flowable at temperatures from 55° C. to −20° C.; from 30° C. to −15° C.; from 10° C. to −12° C. from 0° C. to −12° C. Sauce may be either a fat-based or water-based sauce. Fat based sauce may be for example, chocolate, coverture, chocolate analogue, or fat-based flavored sauces such as caramel or chocolate. Water based sauce may be for example fruit sauce, compote, syrup or water ice mix. More preferably, the sauce is a water-based sauce is selected from the group consisting of fruit sauce, compote or syrup.

In a further embodiment of the invention, the frozen confection product comprises one or more inclusions. Frozen confection products may comprise one or more inclusions that are typically found in frozen confections and frozen confection products. Such inclusions include for example, fruit pieces, chocolate pieces, confectionary, nuts and bakery goods (wafer, biscuit and cake pieces), as described in 'The Science of Ice Cream', C. Clarke, RSC 2004, page 54-59. Preferably, inclusions are selected from the group consisting of nuts, cereal based, confectionary based including caramels, honeycomb meringue, bakery, fruit, chocolate, biscuits or mixtures thereof. The longest length of the one or more inclusions is from 2 mm to 10 mm; from 3 mm to 9 mm, from 4 mm to 8 mm. The frozen confection comprises from 0.5 wt % to 10 wt %, from 1 wt % to 9 wt %, from 4 wt % to 6 wt % inclusions.

In a further aspect, the invention relates to a process for the preparation of a frozen confection product comprising a fluted frozen confection comprising the steps of:
 a. Providing an apparatus for the preparation of a frozen confection product comprising a filling head (1) comprising one or more frozen confection inlets (3) connectable to a source of one or more frozen confections comprising one or more inclusions, a mixing chamber (4) and an outlet (2), a first housing (5) comprising a nozzle (6) is connectable to the filling head outlet (2), and the outlet of the nozzle (7) has a cross section comprising a central section (8) and peripheral sections (9), wherein an annular shape (24) can be superimposed onto the central section (8) and the diameter of the superimposed annular shape (24) has a ratio of from 3:1 to 6:1 of the longest length of the one or more inclusions;

b. Rotating the first housing (5) comprising the nozzle (6); and, c. Passing one or more frozen confections comprising one or more inclusions through the apparatus of step a., wherein the longest length of one or more inclusions present is from 2 mm to 10 mm, d. Extruding the frozen confection comprising and one or more inclusions of step c. into a receptacle.

In a further aspect, the invention relates to a process for the preparation of a frozen confection product comprising a fluted frozen confection comprising the steps of:

a. Providing an apparatus for the preparation of a frozen confection product comprising a filling head (1) comprising one or more frozen confection inlets (3) connectable to a source of one or more frozen confections comprising one or more inclusions, a mixing chamber (4) and an outlet (2), a first housing (5) comprising a nozzle (6) is connectable to the filling head outlet (2), and the outlet of the nozzle (7) has a cross section comprising a central section (8) and peripheral sections (9), wherein the width of the central section (8) and the the longest length of the one or more inclusions, have a ratio of from 3:1 to 6:1, b. Rotating the first housing (5) comprising the nozzle (6);

c. Passing one or more frozen confections comprising one or more inclusions through the apparatus of step a., wherein the longest length of one or more inclusions present is from 2 mm to 10 mm; and, d. Extruding the frozen confection comprising and one or more inclusions of step c. into a receptacle.

In an embodiment of the process the first housing (5) and nozzle (6) is rotated from 1.5 to 3.5; from 2.0 to 3.0 rpm times per frozen confection product filling.

Optionally, step c. comprises passing one or more frozen confections comprising inclusions and one or more first sauces through the apparatus of step a.

Optionally, step c. comprises passing one or more frozen confections comprising inclusions, one or more first sauces and one or more second sauces through the apparatus of step a.

In an embodiment the frozen confection product the receptacle is a cone, tub or cup. Preferably the receptacle is a cone.

In a further aspect, the invention relates to a frozen confection product obtainable by the process. Preferably, the invention relates to a frozen confection cone product obtainable by the process.

In an embodiment of the invention, the frozen confection product comprises one or more frozen confections located within the void of the cone receptacle and extends above the receptacle.

In an embodiment of the invention the frozen confection product comprises one or more frozen confections that extend above the receptacle and is fluted.

In an embodiment of the invention the frozen confection cone product, wherein the flute of the frozen confection is helically fluted. Helically means that the flute is extruded whilst the nozzle (6) is rotated causing a swirl of the peaks and troughs of the flute.

In an embodiment of the invention the frozen confection of the frozen confection product is fluted at the position of the extruded frozen confection when extrusion is discontinued. I.e.: the top of a vertically extruded frozen confection is fluted. The flute may be a helical flute. The frozen confection of the frozen confection product may be positioned within a receptacle and may not extend above the receptacle's rim.

In a further aspect, the invention relates to a frozen confection product comprising a receptacle, one or more frozen confections comprising inclusions, one or more first sauces optionally comprising one or more inclusions, wherein the inclusions are distributed randomly throughout the frozen confection product, the frozen confection that extends above the receptacle is fluted and the longest length of one or more inclusions present is from 2 mm to 10 mm.

In a further aspect, the invention relates to a frozen confection product comprising a receptacle, one or more frozen confections comprising inclusions, one or more first sauces optionally comprising one or more inclusions, wherein the inclusions are distributed randomly throughout the frozen confection product, the frozen confection that extends above the receptacle is helically fluted and partially coated with one or more second sauces, and the longest length of the one or more inclusions present is from 2 mm to 10 mm.

A frozen confection cone product wherein the one or more second sauces is located in the recesses of the flute. Recess is intended to be equivalent to the trough of a flute that comprises peaks and troughs.

Frozen confection means a sweet-tasting fabricated foodstuff intended for consumption in the frozen state (i.e. under conditions wherein the temperature of the foodstuff is less than 0° C.). The frozen confection is selected from the group consisting of water ice, milk-ice, ice cream, frozen yoghurt, frozen custard, sorbet, gelato and mixtures thereof. Ice cream may be selected from the group consisting of dairy ice cream, non-dairy ice cream and mixtures thereof. Preferably the frozen confection comprises ice cream, frozen yoghurt or mixtures thereof. Preferably the frozen confection is aerated. The frozen confection may be prepared, for example, according to methods provided in the 'The Science of Ice Cream', C. Clarke, RSC 2004, chapters 3, 4 and 8; and 'Ice Cream' $5^{th}$ Ed., Marshall and Arbuckle, 1996, Chapman & Hall, New York, N.Y., in particular chapters 11, 12 and 22.

First and second sauce may be the same composition or different, such sauces are also known as variegate, sauce or syrup. The sauce may be a water-based composition or a fat-based frozen confection coating composition. Exemplary sauces are described in described in 'Ice Cream' $7^{th}$ Ed., Goff and Hartel, 2013, pages 115-117.

The frozen confection product comprises from 70 wt % to 99.5 wt % frozen confection, from 0 wt % to 20 wt % sauce, and 0.5 wt % to 10 wt % inclusions.

The frozen confection product comprises from 71 wt % to 94.5 wt % frozen confection, from 5 wt % to 19 wt % sauce, and 0.5 wt % to 10 wt % inclusions.

The frozen confection product comprises from 72 wt % to 89.5 wt % frozen confection, from 10 wt % to 18 wt % sauce, and 0.5 wt % to 10 wt % inclusions.

The frozen confection product comprises from 71 wt % to 79 wt % frozen confection, from 0 wt % to 20 wt % sauce, and 1.0 wt % to 9.0 wt % inclusions.

The frozen confection product comprises from 74 wt % to 96 wt % frozen confection, from 0 wt % to 20 wt % sauce, and 4.0 wt % to 6.0 wt % inclusions.

FIGURES

FIG. 5 illustrates a frozen confection product comprising one or more frozen confections comprising inclusions of longest length of from 2 mm to 10 mm, wherein the frozen confection is positioned within the receptacle and extends above the receptacle, and the frozen confection that extends above the receptacle is fluted and one or more sauces are randomly distributed within the frozen confection products and provided on the fluted surface of the frozen confection. The frozen confection product demonstrates the desired frozen confection product architecture and inclusions that are not damaged and are randomly distributed throughout the frozen confection of the frozen confection product. Furthermore, the apparatus was used without the inclusions sticking to the inside of the nozzle outlet (7) and ultimately blocking the nozzle outlet (7).

EXAMPLES

Figure 1:
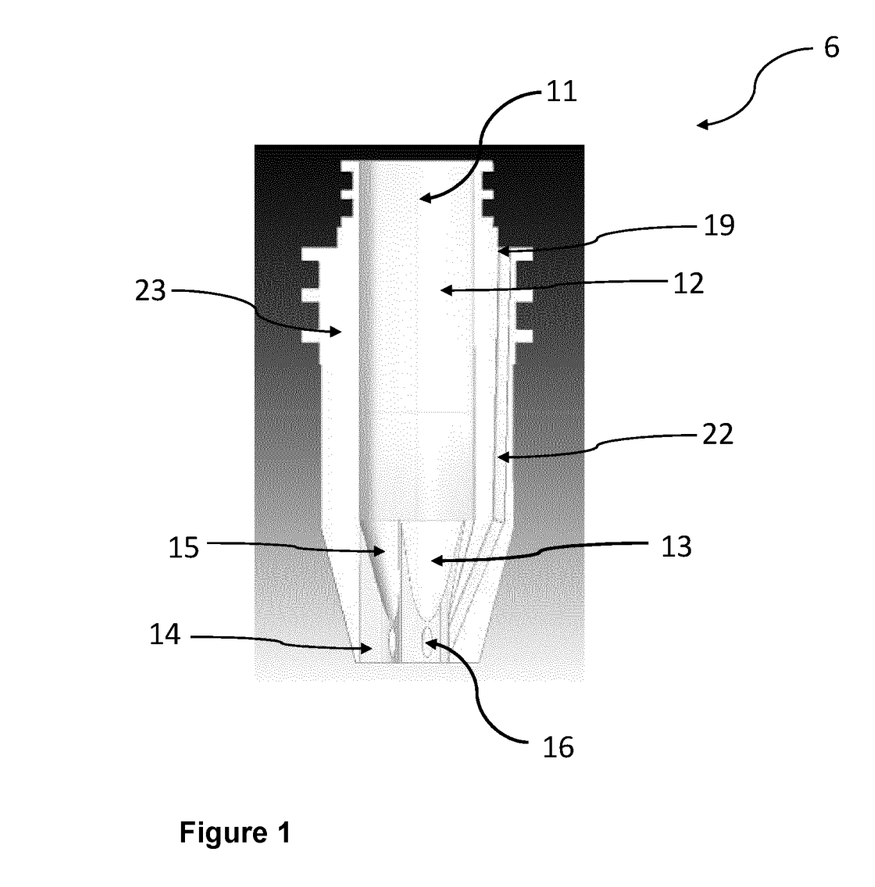
FIG. 1: Illustrates a nozzle (6) of the apparatus of the invention.
Figure 2:
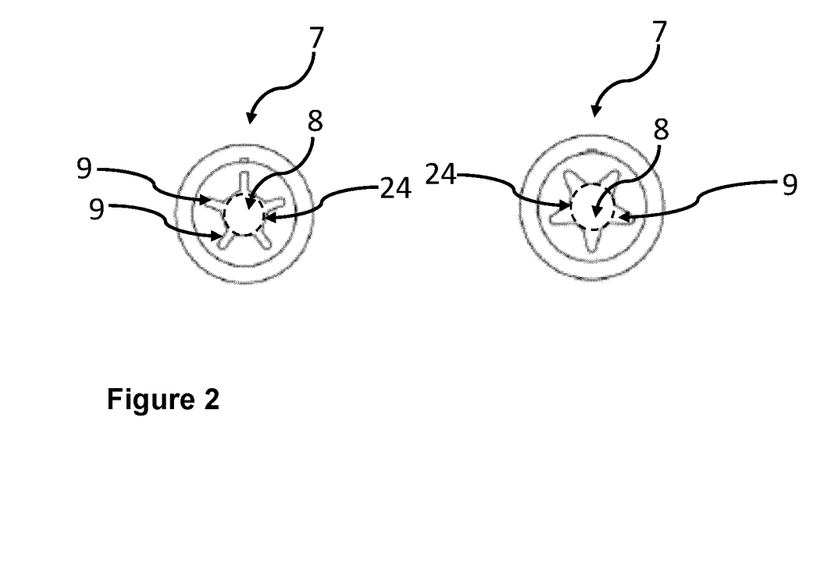
FIG. 2: Illustrates the cross-sectional shape of a nozzle outlet (7) of the apparatus. The central section (8) and peripheral section (9) of the cross section of the nozzle outlet (7) are illustrated together with the superimposable annular shape (24).
Figure 3:
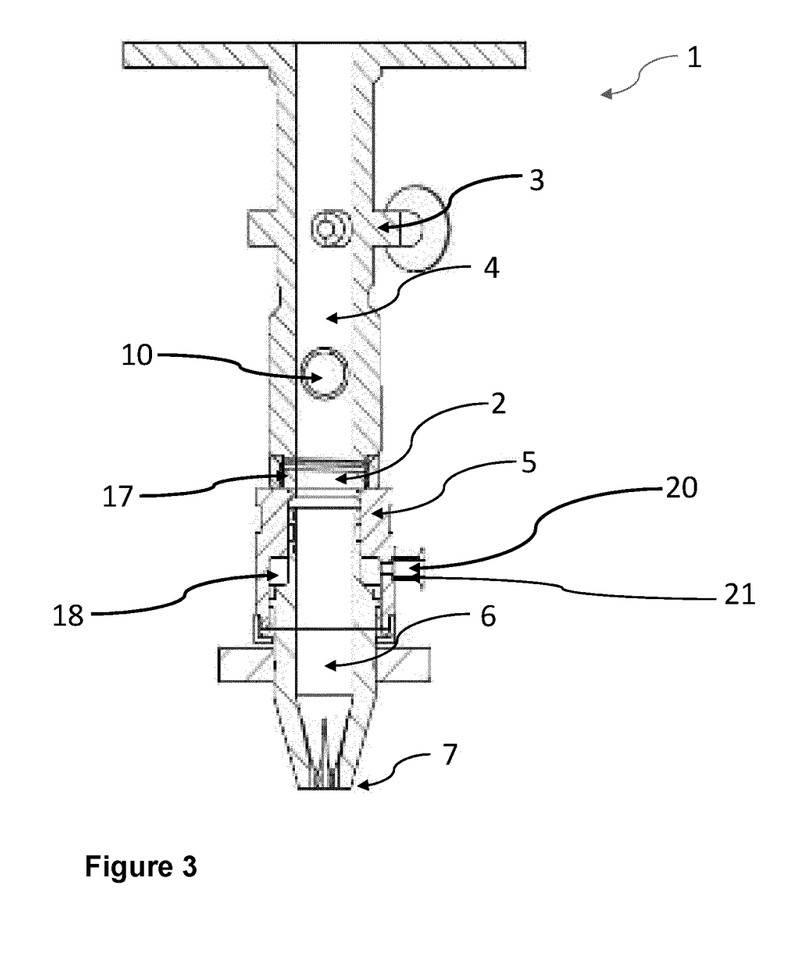
FIG. 3: Illustrates a filling head (1) connected to a nozzle (6) of the apparatus of the invention.
Figure 4:
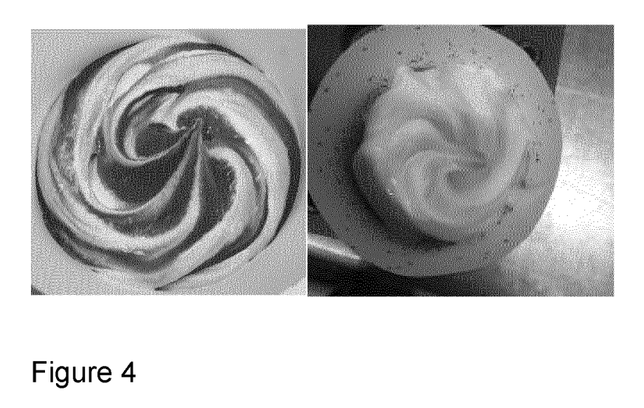
FIG. 4: Illustrates the helical fluted architecture of the top of a frozen confection product prepared from the use of the apparatus illustrated in FIGS. 1 to 3. The second sauce is positioned in the troughs of the flute.
Figure 5:
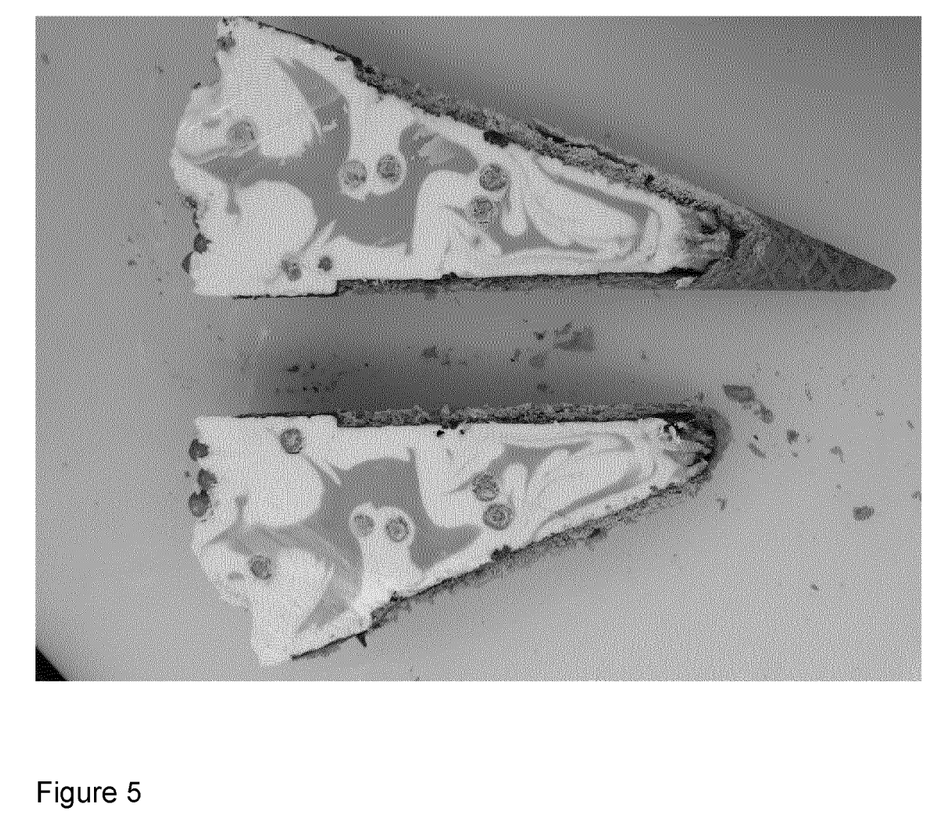
FIG. 5: Illustrates the longitudinal cross-section of a frozen confection product prepared from the use of the apparatus illustrated in FIGS. 1 to 3.

Preparation of a frozen confection product comprising inclusions, sauce and frozen confection.

Frozen confection (41 g) comprising inclusions (16 g) and longest length (8 mm) was extruded into a filling head (1) at a flow rate of 2214 gm$^{-1}$ together with a first sauce (16 g) at a flow rate of 864 gm$^{-1}$. The combined frozen confection and sauce were passed through a filling head (1) comprising a star-shaped nozzle exit (7) and dosed into a cone receptacle together with a second sauce 1 (g) dispensed through the second sauce outlets (16) of the nozzle (6). The product obtained comprised inclusions and sauce distributed randomly throughout the frozen confection and the frozen confection comprises a fluted frozen confection shape extending above the receptacle of frozen confection peaks and sauce present in the troughs of the flute.

The invention claimed is:

1. An apparatus for the preparation of a frozen confection product comprising a filling head (1) comprising one or more frozen confection inlets (3) connectable to a source of one or more frozen confections comprising one or more inclusions, a mixing chamber (4) and a filling head outlet both the first housing and nozzle are (2), a first housing (5), connectable to a nozzle (6) is connectable to, and rotatable in relation to, the filling head outlet (2), wherein the nozzle (6) comprises a nozzle outlet (7) and the cross section of the nozzle outlet (7) is star-shaped that comprises a central section (8) and from 3 to 8 peripheral sections (9) acting as points or arms of the star shape, wherein the diameter of an annular shape (24) that can be superimposed on the central section (8) is from 6 mm to 60 mm, the nozzle further comprising from 3 to 8 longitudinal protrusions (15) positioned on the inner surface of the nozzle walls and wherein the peripheral sections (9) are positioned at equidistant points on the circumference of the annular shape (24) superimposed on the central section (8).

2. An apparatus for the preparation of frozen confection products according to claim 1, wherein the width of the central section (8) is from 6 mm to 30 mm.

3. An apparatus for the preparation of a frozen confection product according to claim 1, wherein the centre of the central section (8) is the rotational axis of the nozzle (6).

4. An apparatus for the preparation of a frozen confection product according to claim 1, wherein the filling head (1) comprises one or more first sauce inlets (10) connectable to one or more sources of one or more first sauces.

5. An apparatus for the preparation of a frozen confection product according to claim 1, wherein the nozzle (6) comprises four parts, the first part (11) is cylindrical adjoining a second part (12) that is cylindrical adjoining a third part (13) that is frusto-conical and tapers towards the fourth part (14) that is cylindrical, wherein both the third and four parts comprise the longitudinal protrusions (15) positioned on the inner surface of the nozzle walls.

6. An apparatus for the preparation of a frozen confection product according to claim 5, wherein the filling head (1) comprises one or more first sauce inlets (10) connectable to one or more sources of one or more first sauces, the walls of the second part (12) of the nozzle (6) comprises a second sauce inlet (19) and one or more second sauce channels (22), the walls of the third part (13) of the nozzle (6) comprise one or more second sauce channels (22) and the walls of the fourth part (14) of the nozzle (6) comprise one or more second sauce channels (22) and second sauce outlets (16), and the first housing (5) comprises a second sauce chamber (18) connectable to a second sauce inlet (20) and a source of second sauce.

7. A process for the preparation of a frozen confection product comprising the steps of:
   a. Providing an apparatus according to claim 1, and rotating the first housing (5) and nozzle (6),
   b. Passing one or more frozen confections comprising one or more inclusions through the apparatus of step a., wherein the longest length of one or more inclusions present is from 2 mm to 10 mm,
   c. Extruding the frozen confection comprising inclusions of step b. into a receptacle.

8. A process according to claim 7, wherein the first housing (5) and nozzle (6) are rotated 1.0 to 4.0 times per product filing.

9. A process according to claim 7, wherein one or more first and one or more second sauces are passed through the apparatus of step a.

* * * * *